United States Patent [19]

Kubota et al.

[11] 4,284,307

[45] Aug. 18, 1981

[54] HYDRAULIC PRESSURE CONTROL VALVE ASSEMBLY FOR AUTOMOTIVE HYDRAULIC BRAKE SYSTEM

[75] Inventors: Hitoshi Kubota; Kazuaki Shimizu, both of Fujisawa, Japan

[73] Assignee: Nissan Motor Company, Limited, Yokohama, Japan

[21] Appl. No.: 36,724

[22] Filed: May 7, 1979

[30] Foreign Application Priority Data

May 9, 1978 [JP] Japan .................................. 53-54026

[51] Int. Cl.³ .............................................. B60T 8/14
[52] U.S. Cl. ................................. 303/6 C; 303/24 C; 303/24 F
[58] Field of Search .................. 303/6 C, 24; 188/349

[56] References Cited

U.S. PATENT DOCUMENTS

| | | | |
|---|---|---|---|
| 3,899,217 | 8/1975 | Ohta | 303/6 C X |
| 4,062,597 | 12/1977 | Sawyer et al. | 303/6 C |
| 4,133,584 | 1/1979 | Ohta et al. | 303/24 C |

Primary Examiner—Douglas C. Butler
Attorney, Agent, or Firm—Schwartz, Jeffery, Schwaab, Mack, Blumenthal & Koch

[57] ABSTRACT

A hydraulic pressure control valve assembly comprising a proportioning valve and a deceleration sensing valve is such arranged that when the magnitude of hydraulic pressure in an expandable chamber of the deceleration sensing valve exceeds a predetermined value in response to rapid deceleration of the vehicle, a piston associated with the expandable chamber is brought into contact with a plunger of the proportioning valve thereby suppressing the axial movement of the plunger in a direction toward the piston. Thus, under this condition, the normal operation of the proportioning valve stops so that the hydraulic pressure in the fluid inlet port is supplied to the fluid outlet port, keeping the pressure unchanged.

6 Claims, 4 Drawing Figures

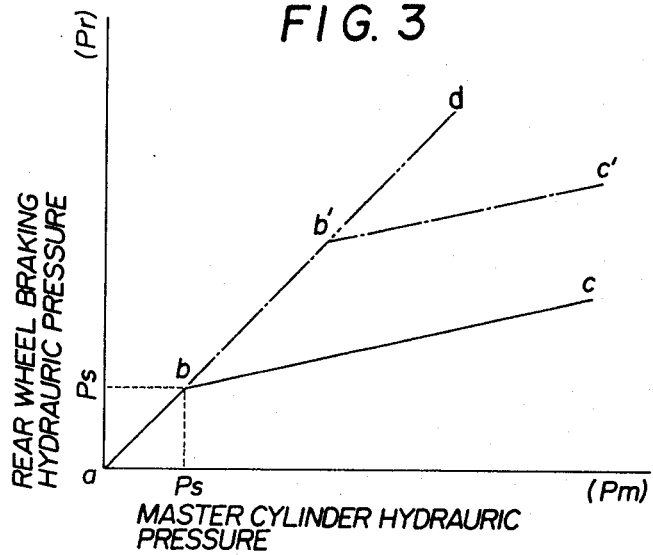
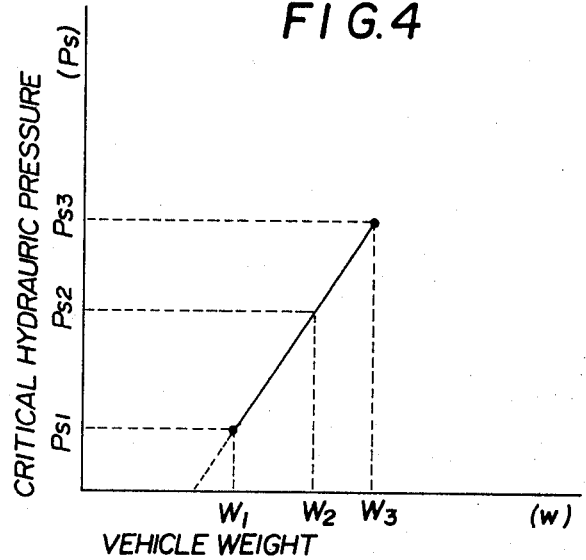

HYDRAULIC PRESSURE CONTROL VALVE ASSEMBLY FOR AUTOMOTIVE HYDRAULIC BRAKE SYSTEM

FIELD OF THE INVENTION

The present invention relates in general to an anti-skid braking system for a wheeled motor vehicle, and more particularly to a hydraulic pressure control valve which limits the rise of hydraulic pressure in the outlet thereof leading to rear wheel brakes irrespective of the hydraulic pressure rise in the inlet thereof leading to a master cylinder of the system.

BACKGROUND OF THE INVENTION

In a hydraulically operated braking system for wheeled motor vehicles, wherein front and rear wheels are braked simultaneously, if the rear wheels are locked first, the vehicle is likely to show rear end skid or "yaw". In fact, such locking is far more dangerous than if the front wheels are locked first. In view of the fact that, upon braking while cruising forward, the effective weight transfer of the vehicle occurs reducing the load on the rear wheels thereby causing the rear wheels to lock more easily than the front wheels, a hydraulic pressure control valve is usually equipped in a rear wheel braking hydraulic line for limiting the rise of hydraulic pressure exerted in the hydraulic line leading to the rear wheel brakes, with respect to the pressure rise in the line leading to the front wheel brakes (Usually, the hydraulic pressure for the front wheel brakes is the same as that of the master cylinder.).

As a hydraulic pressure control valve of the kind referred to, a proportioning valve (which will be referred to as "P-valve" hereinafter) has been proposed. In the P-valve, the pressure value at the time of beginning to limit the rise of the rear wheel braking hydraulic pressure, that is, the critical oil pressure, is constant thereby to make the front and rear wheel brake pressure distribution characteristic constant.

As is known, however, an ideal distribution characteristic for locking (not braking) the front and rear wheels simultaneously is one that varies with the change in the vehicle weight. More specifically, the ideal characteristic is such that the critical hydraulic pressure becomes higher as the vehicle weight increases. Thus, the P-valve is inapplicable to trucks and the like, the weight of which varies greatly depending on whether they are empty or loaded.

In view of the above, there has been proposed a hydraulic pressure control valve assembly which comprises a combination of the P-valve and a deceleration sensing valve (which will be referred to as G-valve hereinafter), which detects any drop of the speed of a vehicle and operates to raise the critical hydraulic pressure in proportion to the increase of the vehicle weight.

With a hydraulic pressure control valve assembly of such a structure, however, when the load is maximum or when the front wheel braking system fails to operate, sufficient critical hydraulic pressure can not be produced, so that the braking force for the vehicle becomes insufficient. In order to solve this problem, some ways are considered effective, for example, increasing the set load of the spring which acts on an actuator member or plunger of the P-valve, increasing the installation slanting angle of the hydraulic pressure control valve with respect to the horizontal line, or increasing the spring constant of the said spring. Two former ways, though achieving the object, result in the critical hydraulic pressure at the time when the vehicle is empty or lightly loaded becoming too high to cause the front and rear wheel brake pressure distribution characteristic to be outside the ideal range, thereby causing the rear wheels to lock at such time. The third way results in not only the critical oil pressure becoming too high around the time when the vehicle is half loaded to cause the front and rear wheel brake pressure distribution characteristic to be outside the ideal range, thereby causing the rear wheels to lock at such time, but also in the stress applied to the actuator member or plunger of the P-valve considerably increasing thereby causing a durability problem and enlargement of the spring, and also of the hydraulic pressure control valve assembly itself.

OBJECTS OF THE INVENTION

Therefore, an essential object of the present invention is to provide a hydraulic pressure control valve assembly which is free of the above-mentioned problems.

It is an object of the present invention to provide a hydraulic pressure control valve assembly which comprises a combination of a P-valve and a G-valve wherein the G-valve functions to prevent the P-valve from functioning when the load on the vehicle is at maximum or when the front wheel braking system fails to operate.

It is another object of the present invention to provide a hydraulic pressure control valve assembly which is constructed by taking into consideration the fact that, in a track of a large size and the like, the weight of which varies greatly depending on whether it is empty or loaded to the maximum, the rear wheels will never be locked by such a small force as produced on a brake pedal by normal human beings, even if, only when the vehicle is loaded to the maximum or when the front wheel braking system fails to operate, the P-valve does not actually function, that is, the oil pressure of the master cylinder is directly supplied to the rear wheel brakes.

BRIEF DESCRIPTION OF THE DRAWINGS

Other objects and advantages of the present invention will become clear from the following description when taken in conjunction with the accompanying drawings, in which:

FIG. 3 is a graph depicting the operation characteristics of the valve assembly of the invention; and FIG. 4 is a graph depicting the relationship between the vehicle weight and the critical hydraulic pressure.

DESCRIPTION OF THE PREFERRED EMBODIMENT

Figure 1:
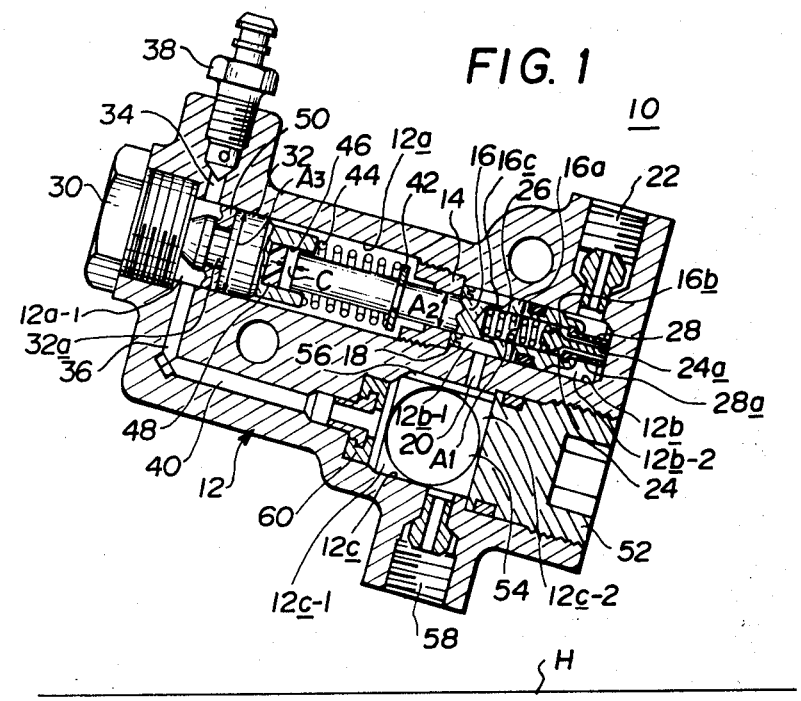
FIG. 1 is a vertical section view of a hydraulic pressure control valve assembly according to the present invention.

Referring to FIG. 1 of the drawings, there is illustrated a hydraulic pressure control valve assembly according to the present invention, which is generally designated by numeral 10. The assembly 10 comprises a body 12 having therein a cylindrical chamber 12a, a blind cylindrical chamber 12b of a reduced diameter merged with the chamber 12a to be lined, and another cylindrical chamber 12c arranged parallel to the blind chamber 12b. Screwed to the open end of the blind chamber 12b is an annular guide member 14 which slidably supports a plunger 16 received in an elongated space consisting of the chambers 12a and 12b so that the plunger 16 is axially movable in the elongated space. The plunger 16 is formed at a section thereof positioned in the blind chamber 12b with a land 16a. The land 16a is sealingly and slidably engaged with the cylindrical wall of the blind chamber 12b and divides the chamber 12b into first and second sections 12b-1 and 12b-2, as shown. The section 12b-1 is isolated from the chamber 12a by an annular sealing member 18, but communicates with the chamber 12c through a passage 20 formed in the body 12. The section 12b-2 communicates with a fluid outlet port 22 also formed in the body 12.

The plunger 16 is formed at its right section, in the drawing, with an axially extending blind hole 16b which is open to the second section 12b-2 of the blind chamber 12b. In the blind hole 16b is arranged a poppet valve 24 which is biased to move rightwardly in the drawing by means of a spring 26 set in the blind hole 16b. A cylindrical valve seat 28 is fixed at and projected rightwardly from the entrance of the blind hole 16b, upon which the poppet valve 24 bears to seal the blind hole 16b. The valve seat 28 is formed at the cylindrical wall thereof with openings 28a which provide constant communication between the interior of the valve seat 28 and the blind chamber 12b. A valve stem 24a of the poppet valve 24 is constructed and sized such that it projects slightly toward the bottom wall of the blind chamber 12b from the right open end of the valve seat 28 when the valve is closed. The blind hole 16b communicates with the first section 12b-1 of the blind chamber 12b through openings 16c formed in the plunger 16 near the bottom of the blind hole 16b. Thus, it will be appreciated that when the right open end of the valve seat 28 is in contact with the bottom wall of the blind chamber 12b, the poppet valve 24 is open so that communication between the second section 12b-2 and the first section 12b-1 becomes established through the openings 28a, the blind hole 16b and openings 16c.

The left end of the cylindrical chamber 12a is plugged with a sealing lid 30. A piston 32 is sealingly and slidably disposed in the chamber 12a to define between the piston 32 and the sealing lid 30 a first section 12a-1 of the chamber 12a. Two passages 34 and 36 communicating with the first section 12a-1 are formed in the body 12 to extend radially outwardly. An air bleed valve 38 is screwed to the body 12 to communicate with the passage 34. A passage 40 connecting the passage 36 with the chamber 12c is formed in the body 12.

A spring seat 42 is fixed to the plunger 16 at a section of the plunger 16 projecting inside the chamber 12a. A spring 44 is arranged and compressed between the spring seat 42 and the piston 32. A further blind hole 46 is formed in the right end section of the piston 32 to slidably receive therein a left end of the plunger 16. An elastomeric member 48 is fitted to the bottom wall of the blind hole 46. It should be noted that under a condition where the plunger 16 takes its rightmost position and the piston 32 takes its leftmost position as shown in the drawing, a certain clearance "C" is defined between the left end of the plunger 16 and the open surface of the elastomeric member 48 so that relative axial movements are enabled between the plunger 16 and the piston 32. About the piston 32 is formed a groove 32a into which a seal ring 50 is disposed for sealing the piston 32.

The right end of the chamber 12c is sealed with a plug 52. Within the chamber 12c is slidably movably received a ball 54 which thus divides the chamber 12c into first and second sections 12c-1 and 12c-2. These sections communicate with each other by an axially extending groove 56 formed in the cylindrical wall of the chamber 12c. A fluid inlet port 58 communicating with the second section 12c-2 of the chamber 12c is formed in the body 12. A valve seat 60 is fixed to the right open end of the passage 40, on which the ball 54 is to sit when shutting the passage 40.

Figure 2:
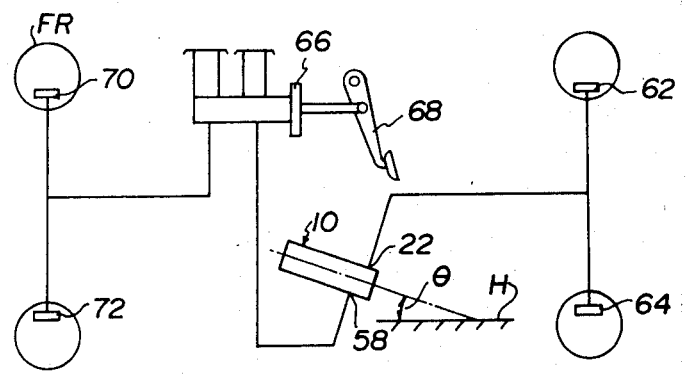
FIG. 2 is a diagram depicting the manner of installation of the valve assembly in the automotive hydraulic braking system.

In the above-mentioned hydraulic pressure control valve assembly 10 of the invention, the plunger 16, the poppet valve 24, the valve seat 28, the spring seat 42 and the spring 44 constitute a P-valve, whereas the piston 32, the ball 54, and the valve seat 60 constitute a G-valve. When this assembly 10 is mounted on the vehicle body, it is so slanted with respect to the horizontal plane "H" that in the normal state of the assembly, the ball 54 will be in contact with the plug 52 by its own weight, as shown in FIG. 1, in particular, it is slanted with an angle "$\theta$" with respect to the horizontal plane "H" as shown in FIG. 2.

As shown in this drawing, in actual use, the outlet port 22 of the assembly 10 is connected to brake cylinders 62 and 64 of right and left rear wheels (no numerals), and the inlet port 58 is connected to one of the outlet ports of a master cylinder 66. Designated by numeral 68 is a brake pedal. The other of the outlet ports of the master cylinder 66 is connected to brake cylinders 70 and 72 of right and left front wheels (no numerals). The brake for the wheel may be a disc brake or a drum brake.

The operation of the hydraulic pressure control valve assembly 10 of the invention is as follows.

Usually, the assembly 10 is maintained in the state as shown in FIG. 1 wherein the ball 54 is spaced from the valve seat 60 connecting the passage 40 with the chamber 12c, the plunger 16 with the spring seat 42 is maintained spaced a maximum distance from the piston 32 by the spring 44, the poppet valve 24 opens with the stem 24a pushed leftwardly by the bottom wall of the blind chamber 12b, and the piston 32 is pushed against the inner end surface of the sealing lid 30. When the brake pedal 68 is acted upon to cause the master cylinder 66 to form a hydraulic pressure $P_m$, the hydraulic pressure $P_m$ is supplied directly to the front wheel brake cylinders 70 and 72 and also to the rear wheel brake cylinders 62 and 64 through the inlet port 58, the cylindrical chamber 12c, the section 12b-1 of the blind cylindrical chamber 12b, the openings 16c of the plunger 16, the blind hole 16b of the plunger 16, the interior of the cylindrical valve seat 28, the openings 28a of the valve seat 28, the second section 12b-2 of the blind hole 12b, and the outlet port 22. Therefore, in this condition, the braking hydraulic pressure $P_r$ for the rear wheel brake cylinders 62 and 64 is equal to that of the front wheel brake cylinders 70 and 72, more specifically to the master cylinder hydraulic pressure $P_m$, so that the rear wheel braking pressure $P_r$ rises with the characteristic shown by "a—b" in FIG. 3. The balance formula of the force applied to the plunger 16 is presented as follows:

$$P_m \cdot A_2 = F \tag{1}$$

where, $A_2$ ... Inner hole sectioned area of the annular guide member 14, and

F . . . Force generated by the spring 44.

When the master cylinder hydraulic pressure $P_m$ rises, due to the working of the brake pedal 68, the left side of the above formula becomes larger, thereby moving the plunger 16 leftwardly in FIG. 1 against the force of the spring 44 and finally moving the plunger to a position to allow the poppet valve 24 to close. The hydraulic pressure at this time, that is, the critical hydraulic pressure $P_s$ is represented by the following equation, corresponding to the above equation wherein $P_m$ is substituted by $P_s$, $$P_s = F/A_2 \tag{2}$$

When the master cylinder hydraulic pressure $P_m$ continues to rise due to the continuous working of the brake pedal 68, it begins to push the plunger 16 rightwardly in FIG. 1, with a force $P_m(A_1-A_2)$ wherein $A_1$ represents the area of the hole 12b, and when the poppet valve 24 is opened, the oil pressure is supplied to the outlet port 22 through the valve 24, thereby increasing the rear wheel braking hydraulic pressure $P_r$. When $P_m$ is equal to or more than $P_s$, that is, $P_m \geq P_s$, the balance of the force applied to the plunger 16 is represented by the following equation:

$$P_r A_1 = P_m(A_1 - A_2) + F \tag{3}$$

From the above equation (3), the rear wheel braking hydraulic pressure $P_r$ is derived and represented by the following equation:

$$P_r = \frac{A_1 - A_2}{A_1} P_m + \frac{F}{A_1} = m \cdot P_m + \frac{F}{A_1} \tag{4}$$
wherein
$$m \ldots \frac{A_1 - A_2}{A_1}$$

As is clear from the above equation (4), when the master cylinder hydraulic pressure $P_m$ becomes higher than the critical hydraulic pressure $P_s$, the rear wheel braking hydraulic pressure $P_r$ rises with a smaller slope "m" than the slope "1" of the equation (2), as shown by "b−c" in FIG. 3, thereby preventing the rear wheels from becoming locked.

On the other hand, when the master cylinder hydraulic pressure $P_m$ rises, the braking force "B" will also rise and the deceleration "α", which is obtained by dividing the braking force "B" with the vehicle weight "W", will also rise, as is obvious from the following equations:

$$B = C \cdot P_m \tag{5}$$

wherein C: a constant $$\alpha/g = B/W \tag{6}$$

wherein g: gravitational acceleration.

When the deceleration ratio "α/g" reaches to the next-mentioned fixed value which is determined by the sloping angle "θ" (θ is the inclination angle of the assembly 10 with respect to the horizontal plane "H"), $$(\alpha/g)_0 = f(\theta) \tag{7}$$

wherein f(θ): function of θ, the ball 54 moves by its inertia leftwardly in FIG. 1 against the divided force of the gravitational acceleration in the direction of the sloping angle θ, and closes the opening of the valve seat 60. Thus, even if the master cylinder hydraulic pressure $P_m$ increases further, the pressure applied to the piston 32 will be maintained at the same as that at the time when the ball 54 closes the opening of the valve seat 60. The pressure $P_G$ inside the first section 12a-1 of the chamber 12a at this time is represented by the following equation, $$P_G = \frac{f(\theta)}{C} \cdot W \tag{8}$$

The force for pushing the piston 32 rightwardly in FIG. 1, which is represented by a product of the hydraulic pressure $P_G$ and the pressure receiving area $A_3$ of the piston 32, will balance with the force "F" of the spring 44 at this time, and the following equation is obtained:

$$F = P_G \cdot A_3 = \frac{f(\theta)}{C} A_3 \cdot W \tag{9}$$

By putting the equation (9) into the equation (2), the later will be modified into the following equation, $$P_s = \frac{\frac{f(\theta)}{C} A_3 W}{A_2} \tag{10}$$

Therefore, when $P_r$ is larger than $P_s$, that is, $P_r > P_s$, the above equation (4), that is, $$P_r = m \cdot P_m + \frac{F}{A_1}$$

is modified by the equation (10) into the following one, $$P_r = m \cdot P_m + \frac{\frac{f(\theta)}{C} A_3 W}{A_1} \tag{11}$$

Thus, the relationship between the critical hydraulic pressure "$P_s$" and the vehicle weight "W" is obtained, as shown in FIG. 4. As is clear from this graph, the critical hydraulic pressure $P_s$ rises with increase of the vehicle weight (W).

As is understood from the foregoing, the split point "b", shown in FIG. 3, rises as the load on the vehicle increases. Thus, the rear wheel braking hydraulic pressure $P_r$ will rise, for example, when the vehicle is half loaded, with the characteristic indicated by a−b'−c' in FIG. 3, which is substantially the ideal for rear wheel braking hydraulic pressure.

On the other hand, when the vehicle is loaded to its maximum, or the front wheel brakes 70 and 72 fail to operate, the pressure $P_G$ will become higher because the brake pedal 68 should be worked with much greater force to obtain a sufficient braking force, the stroke of the plunger 16 will become correspondingly greater, and the force of the spring 44 applied to the plunger 16 will also become greater, but the critical oil pressure $P_s$ will only have too low of a rise, and the ideal brake distribution characteristic is not obtained. According to the assembly 10 of the invention, however, the critical hydraulic pressure at the time when the vehicle is loaded to the maximum, or the front wheel brakes 70 and 72 fail to operate, is increased still more in the following manner.

At this time, the pressure in the first section 12a-1 of the cylindrical chamber 12a rises all the more, which finally presses the piston 32 to the farthest right position in FIG. 1 to cause the plunger 16 to collide with the piston 32, then the valve seat 28 is arrested at the farthest right position, where it contacts the bottom wall of the blind chamber 12b and, consequently, the poppet valve 24 is spaced from the valve seat 28 to open. Accordingly, the inlet and outlet ports 58 and 22 are in communication through the cylindrical chamber 12c, the passage 20, the section 12b-1 of the chamber 12b, the openings 16c of the plunger 16, the blind hole 16b of the plunger 16, the openings 28a of the valve seat 28, and the second section 12b-2 of the blind hole 12b, so that the master cylinder oil pressure $P_m$ is supplied unchanged to the rear wheel brakes 62 and 64 irrespective of the force applied by the brake pedal 68. Therefore, at this time, the rear wheel braking oil pressure $P_r$ rises with a characteristic shown by "a−d" in FIG. 3 thereby solving the problem caused by the insufficient braking force. Even with the characteristic having no split points, the rear wheels will never be locked when a truck of a large size is loaded to its maximum, or the front wheel brakes fail to operate.

Since, in the valve assembly 10, the elastomeric member 48 is arranged between the plunger 16 and the piston 32, the shock due to collision between the plunger 16 and the piston 32 will be absorbed thereby giving a driver a comfortable brake pedal operation feeling.

What is claimed is:

1. A hydraulic pressure control valve assembly for a hydraulic brake system for a wheeled vehicle, comprising:

a housing having therein a fluid inlet port, a fluid outlet port, and first and second interconnecting coaxial blind chambers, each said blind chamber having a blind end opposite the other said blind chamber;

a plunger slidably mounted in said second blind chamber, a portion of said plunger extending into said first blind chamber, said plunger dividing said second blind chamber into a first section opposite said blind end thereof, and a second section adjacent said blind end thereof, said first section being in communication with said inlet port, and said second section being in communication with said outlet port, said plunger having an axial blind hole therein, said blind hole being in communication with both said first and said second sections of said second blind chamber, said plunger being movable toward said blind end of said second blind chamber in response to hydraulic pressure in said first section of said second blind chamber, and movable away from said blind end of said second blind chamber in response to hydraulic pressure in said second section of said second blind chamber;

a poppet valve and seat in said blind hole between said first and second sections of said second blind chamber to control the transfer of hydraulic pressure therebetween, said poppet valve having a stem extending through said seat and beyond said plunger toward said blind end of said second blind chamber to contact said blind end of said second blind chamber and open said poppet valve when said plunger moves toward said blind end of said second blind chamber, said poppet valve being coupled with a biasing means to bias said poppet valve into a closed position against its seat to, in turn, interrupt the transfer of hydraulic pressure from said inlet port to said outlet port when said plunger moves away from said blind end of said second blind chamber;

a single spring axially disposed in said valve body to urge said plunger toward said blind end of said second blind chamber, the combination of said spring, said plunger, and said poppet valve constituting a proportionally limiting valve to proportionally limit an increase in hydraulic pressure at said outlet port resulting from an increase of hydraulic pressure at said inlet port;

a piston slidably disposed in said first blind chamber, said single spring being interposed between said piston and said plunger to urge said piston and said plunger in opposite directions, said piston defining a sealed expandable chamber between said piston and said blind end of said first blind chamber, said expandable chamber being communicable with said inlet port;

a deceleration valve interposed between said inlet port and said expandable chamber, said deceleration valve including means for controlling the transfer of hydraulic pressure to said expandable chamber in accordance with the deceleration of said vehicle, said piston being movable into an override position in response to a predetermined hydraulic pressure in said expandable chamber to suppress the axial movement of said plunger by moving into mating engagement with said plunger, urging said plunger toward said blind end of said second blind chamber, and causing said stem of said poppet valve to contact said blind end of said second blind chamber, thereby opening said poppet valve, thereby overriding the proportional pressure limiting function of said proportionally limiting valve.

2. A hydraulic pressure control valve as claimed in claim 1, in which said piston has a receptacle, formed in the side thereof adjacent said plunger, for slidably receiving a portion of said plunger when said piston and said plunger move into mutual engagement.

3. A hydraulic pressure control valve as claimed in claim 2, in which said plunger has a first end in said first blind chamber and a second end in said second blind chamber, and in which said receptacle has an elastomeric shock-absorbing member disposed therein, said shock-absorbing member facing said first end of said plunger in opposed relationship therewith, said shock-absorbing member and said receptacle being so disposed relative to said plunger that said shock-absorbing member is engageable with said first end of said plunger, whereby said shock-absorbing member engages said first end of said plunger to absorb shock caused by the collision of said plunger and said piston when said piston and said plunger move into mutual engagement.

4. A hydraulic pressure control valve as claimed in claim 1, wherein said deceleration valve comprises a ball which is urged into a seat in response to a predetermined degree of deceleration.

5. A hydraulic pressure control valve assembly for a hydraulic brake system for a wheeled vehicle, comprising a proportioning valve having a plunger which is axially movable in one direction against the force of a spring in response to application of hydraulic pressure to a fluid inlet port for proportionally limiting the rise of hydraulic pressure in a fluid outlet port, and a deceleration sensing valve for changing the time of beginning of the proportionally limiting operation of the proportioning valve in accordance with the degree of a deceleration of the vehicle, said deceleration sensing valve having a piston which supports an end of said spring and is sealingly and movably disposed in a chamber to define a sealed expandable chamber which is communicable with the fluid inlet port to enable the sealed expandable chamber to contain therein a fluid of which the pressure is changeable in accordance with the degree of the deceleration of the vehicle, wherein said spring is disposed between said plunger and said piston to bias them to move in the opposite directions, and said piston and said plunger are arranged such that when the magnitude of hydraulic pressure in the sealed expandable chamber exceeds a predetermined value thereby shifting said piston toward said plunger by a predetermined distance against the force of said spring, said piston collides and is brought into contact with said plunger thereby to suppress the axial movement of said plunger in said one direction, and wherein said piston includes a blind hole into which an end of said plunger is slidably received, the bottom wall of said blind hole being brought into contact with the extreme end of said plunger when said piston moves toward said plunger by the predetermined distance.

6. A hydraulic pressure control valve assembly as claimed in claim 5, further comprising a shock-absorbing member which is disposed on the bottom wall of said blind hole to absorb shock caused by collision of said piston and said plunger.

* * * * *